United States Patent Office 2,735,871
Patented Feb. 21, 1956

2,735,871
TREATMENT OF ARALKYL HYDROPEROXIDES

Curtis W. Smith, Berkeley, Calif., assignor to Shell Development Company, Emeryville, Calif., a corporation of Delaware No Drawing. Application January 21, 1952,
Serial No. 267,497

19 Claims. (Cl. 260—610)

This invention relates to the treatment of aralkyl hydroperoxides and relates more particularly to the treatment of $\alpha,\alpha$-substituted aralkyl hydroperoxides. The class of aralkyl hydroperoxides to the treatment of which the present invention relates are represented by the empirical formula

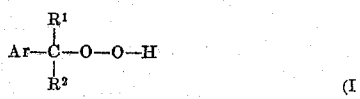
(I)

wherein Ar is an aromatic hydrocarbon radical selected from the group consisting of aryl and alkaryl groups which have at least one replaceable nuclear hydrogen atom and $R^1$ and $R^2$ each represent the same or a different member of the group consisting of hydrogen and any monovalent organic radical, aliphatic, cycloaliphatic, aromatic, heterocyclic, including hydrocarbon radicals such as alkyl, cycloalkyl, aryl, aralkyl, alkaryl, saturated and unsaturated groups. The radical Ar may be mono- or poly-nuclear. The radicals Ar, $R^1$ and $R^2$ may be further substituted by minor substituents such as methoxy, ethoxy, chloro, bromo, and nitro radicals. The organo hydroperoxide employed in the process of the invention may be obtained from any suitable source and include those obtained by the oxidation of aromatic organic compounds having the structural formula

wherein Ar, $R_1$ and $R_2$ have the same significance as in the previously described structural Formula I for the organo hydroperoxides.

The treatment of the present invention is applied with particular advantage to the aralkyl hydroperoxides comprising the hydroperoxides of the alkyl benzenes which have at least one replaceable hydrogen atom directly attached to the benzene ring and in which the hydroperoxide group (—O—O—H) is linked to an aliphatic carbon atom which is directly attached by a single bond to a nuclear carbon atom in the benzene ring. The suitable alkyl benzene hydroperoxides are represented by the empirical formula

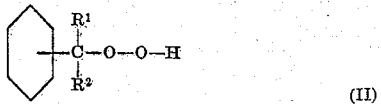
(II)

wherein the $R^1$ and $R^2$ represent the same or different members of the group consisting of hydrogen and hydrocarbon radicals such as alkyl, cycloalkyl, aryl, alkaryl, and aralkyl. The radical $R^1$ may be joined to the radical $R^2$ to form a cyclic nucleus containing the carbon atom to which the hydroperoxide group is attached. One or more replaceable hydrogen atoms attached to the benzene nucleus except at least one may be substituted by an aliphatic hydrocarbon radical such as alkyl and cycloalkyl radicals.

The above defined alkyl benzene hydroperoxides may be referred to as members of the class consisting of benzyl hydroperoxide and hydrocarbyl-substituted benzyl hydroperoxides such as alkyl- and cycloalkyl-substituted benzyl hydroperoxides.

The treatment is particularly effective when applied to the secondary and tertiary alkyl benzene hydroperoxides wherein the hydroperoxyl (—O—O—H) group is attached to a secondary or tertiary carbon atom which is in turn directly linked by a single bond to the benzene nucleus. These preferred alkyl benzene hydroperoxides, that is $\alpha,\alpha$-dialkylphenylmethyl hydroperoxides, are represented by the above Formula II when both of the radicals $R^1$ and $R^2$ are the same or different members of the group consisting of alkyl and cycloalkyl radicals.

Examples of the above-defined organo hydroperoxides are:

Benzyl hydroperoxide
p-Xylyl hydroperoxide
$\alpha$-Phenylethyl hydroperoxide
$\alpha$-Propyl benzyl hydroperoxide
$\alpha,\alpha$-Dimethylbenzyl hydroperoxide
$\alpha$-Ethyl-$\alpha$-methylbenzyl hydroperoxide
$\alpha,\alpha$-Dimethyl-p-methylbenzyl hydroperoxide
$\alpha,\alpha$-Dimethyl-p-isopropylbenzyl hydroperoxide
Diphenylmethyl hydroperoxide
1-tetralyl hydroperoxide
$\alpha,\alpha$-Dimethylnaphthylmethyl hydroperoxide
$\alpha,\alpha,\alpha',\alpha'$-Tetramethyl-p-xylylene dihydroperoxide Of the aralkyl hydroperoxide compounds defined above those wherein the total number of carbon atoms range from 7 to about 26, and wherein individual substituent hydrocarbon groups such as alkyl or cycloalkyl substituents contain from 1 to about 14 carbon atoms are particularly contemplated as materials treated in accordance with the invention.

The above-defined aralkyl hydroperoxides find application as starting and intermediate materials in the production of variable chemical derivatives therefrom. Thus, they are applied as starting materials in the production of phenolic compounds and ketones therefrom. $\alpha,\alpha$-Dimethylbenzyl hydroperoxide, for example, is converted to phenol and acetone by acid catalyzed decomposition. In copending application U. S. Serial No. 251,832 filed October 17, 1951, now U. S. Patent 2,669,588, issued February 16, 1954, it has been disclosed and claimed that aralkyl hydroperoxides such as, for example $\alpha,\alpha$-dimethylbenzyl hydroperoxide can be reacted with a phenolic compound in the presence of acidic catalysts to result in the obtaining of reaction products comprising valuable bis-hydroxyaryl compounds. The aralkyl hydroperoxides are also of particular value as promoters for many polymerization reactions.

The efficiency with which the arylkyl hydroperoxides can be employed in such fields of application is often governed to a substantial degree by their purity as determined by aralkyl hydroperoxide content. Aralkyl hydroperoxides obtained commercially generally contain substantial amounts of impurities. Increasing the aralkyl hydroperoxide content thereof by methods capable of efficient practical scale application is of prime importance since an increase of even only a moderate degree reflects a substantial increase in efficiency in execution of the process wherein these hydroperoxides are employed as reactants or catalysts.

It is an object of the present invention to provide an improved process enabling the more efficient purification by practical scale procedures of $\alpha,\alpha$-dialkyl aralkyl hydroperoxides.

A specific object of the invention is the provision of an improved process enabling the more efficient purification of α,α-dialkylbenzyl hydroperoxide. Other objects and advantages of the invention will become apparent from the following detailed description thereof.

In accordance with the present invention crude aralkyl hydroperoxides, containing oxygen-containing organic impurities, such as the aralkyl hydroperoxides obtained by the direct oxidation with molecular oxygen of the corresponding aromatic compounds, for example, are treated with hydrogen peroxide in the presence of an acidic medium to thereby increase the purity thereof as evidenced by increased aralkyl hydroperoxide content.

The treatment of the aralkyl hydroperoxide in accordance with the invention is effected by bringing the aralkyl hydroperoxide and the hydrogen peroxide into contact with each other in the presence of an acidic catalyst in a suitable treating zone. The treatment within the treating zone is preferably effected in the presence of a suitable solvent. Suitable solvents comprise, for example: a hydrocarbon solvent, such as the paraffins; alcohols, such as methyl-, ethyl-, isopropyl-, isobutyl-alcohol; ethers; or any other solvent or diluent which is substantially inert under the conditions at which the treatment is carried out. Preferred solvents comprise those in which the hydroperoxides and the acid catalyst possess appreciable solubility. Particularly preferred solvents comprise the carboxylic acids, for example, formic, acetic, propionic, n-butyric, isobutyric, n-valeric, n-caproic acids, etc. These organic acids per se, are generally not capable of functioning as the acidic catalyst and are used as acidic solvent. Of carboxylic acids acetic acid is a particularly preferred solvent.

The aralkyl hydroperoxide may be introduced into the treating zone as such, or may be dissolved, suspended, or dispersed in the suitable solvent. It is to be stressed that more than one solvent or diluent may be employed within the scope of the invention. A desirable diluent employed per se or in addition to the carboxylic acid solvent comprises hydrocarbons consistings essentially of the corresponding aromatic hydrocarbon from which the aralkyl hydroperoxide is derived by oxidation with molecular oxygen. Thus an α,α-dialkyl-phenylalkyl hydroperoxide for example, α,α-dimethylbenzyl hydroperoxide, may be dissolved in isopropyl benzene prior to treatment. The aralkyl hydroperoxide-containing mixtures obtained by the oxidation of the corresponding aromatic hydrocarbon may be subjected as such to the treatment with hydrogen peroxide.

The hydrogen peroxide may be introduced into the treating zone in relatively pure state or dispersed in a portion of solvent used during the treatment. Aqueous solutions of hydrogen peroxide may be employed. Relatively small amounts of hydrogen peroxide generally will suffice to effect a material increase in purity of the aralkyl hydroperoxide. The hydrogen peroxide employed in the treatment may range, for example, from about 5% to about 50%, and preferably from about 10% to about 35% by weight of the crude cumene hydroperoxide. Higher or lower amounts of hydrogen peroxide may be employed within the scope of the invention. The optimum amount of hydrogen peroxide will, of course, vary in accordance with the degree of contamination of the crude cumene hydroperoxide to be treated.

Acid catalysts employed in the treatment of the aralkyl hydroperoxide with hydrogen peroxide comprise the strong acids, for example, those having a dissociation constant greater than $10^{-3}$, and particularly the strong mineral acids. Examples of such suitable catalysts are: sulfuric acid, phosphoric acid, hydrobromic acid, nitric acid, hydrofluoric acid, acetyl chloride, dimethyl sulfate, $SO_2$, boron trifluoride, boron trifluoride complexes, $FeCl_3$, $AlCl_3$, perchloric acid, as well as materials liberating an acid-acting agent having the effect of a strong acid under the conditions of the treatment. The specific amount of acidic catalyst to be employed in each specific case will vary within the scope of the invention in accordance with such factors as the degree of contamination of the cumene hydroperoxide, the specific acid catalyst employed and conditions maintained in the treating zone. The presence of the catalyst, for example, a strong mineral acid, such as sulfuric acid, in an amount ranging, for example, from about 0.01 to about 20%, and more particularly from about 1 to about 10% by weight of the cumene hydroperoxide, is satisfactory. Higher or lower amounts of the acid catalysts may, however, be employed within the scope of the invention. It is to be noted, however, that the amount of acid is generally maintained below the amount which, under the conditions of temperature and pressure maintained in the treating zone, would result in promoting reaction of the aralkyl hydroperoxide to any substantial degree. In addition to the strong acid catalysts, secondary catalysts capable of further promoting the favorable effect of the treatment upon the cumene hydroperoxide may be employed.

The temperature at which the treatment is carried out is controlled to avoid the conversion to any substantial degree of the aralkyl hydroperoxide undergoing treatment and to assure the beneficial effect of the hydrogen peroxide treating agent upon impurities in the aralkyl hydroperoxide undergoing treatment. The specific temperature employed will vary to some degree in accordance with the specific aralkyl hydroperoxide undergoing treatment. Temperatures in the range of, for example, from about −60° C. to about 35° C. are generally satisfactory. In the treatment of α,α-dialkylbenzyl hydroperoxides such as, for example, α,α-dimethylbenzyl hydroperoxide with a strong mineral acid such, as, for example, sulfuric acid, temperatures in the range of, for example, from about −60° C. to about 35° C., and preferably from about −10° C. to about 15° C. are suitable.

The hydrogen peroxide or the acid catalyst, optionally dispersed in a suitable solvent, may be introduced separately into the treating zone, or either one or both may be added to the crude aralkyl hydroperoxide to be treated prior to its introduction into the treating zone. Any suitable treating zone enabling intimate contact under the conditions of the treatment may be employed within the scope of the invention. Thus, the treating zone may comprise one or more zones of enlarged cross-sectional areas, such as columns, tanks, chambers, etc., provided with suitable means for agitating the contents thereof. Suitable agitating means which may be employed comprise, for example, conventional stirring devices, the injection of inert fluids, such as inert gaseous materials. When employing a plurality of chambers or tanks these may be connected in series or parallel flow. The treatment may also be carried out in treating zones of restricted cross-sectional areas such as, for example, tubular treating vessels or coils, through which the crude cumene undergoing treatment is passed. When employing tubular-type treaters the hydroperoxide treating agent, or the catalyst, or both, may be injected into the coil at a plurality of spaced points along the length thereof. The treating operation may be conducted batchwise, semicontinuously or continuously.

Treatment of the crude aralkyl hydroperoxide under the above-defined conditions will be found to effect favorably the efficiency of process operations in which cumene hydroperoxide so treated is employed. Without intent to limit in any wise the scope of the invention by theory advanced herein to set forth more fully the nature of the invention, it is believed that the advantageous effect of the treatment is attributable to at least a substantial degree of the interaction of hydrogen peroxide and oxygen-containing organic impurities in the aralkyl hydroperoxide. The interaction of the hydroperoxide treating agent with the oxygen-containing organic impurities is believed to result in converting at least a substantial part of the impurities to an additional amount of desired aralkyl hydroperoxides, and to render relatively innocuous to further reactions another substantial portion of the impurities originally present in the crude cumene hydroperoxide. Thus α,α-dialkylphenylalkyl hydroperoxides such as, for example, α,α-dimethylbenzyl hydroperoxide obtained by the direct oxidation of isopropyl benzene will generally comprise substantial amounts of oxygen-containing impurities including for example, α,α-dimethylbenzyl alcohol (cumyl alcohol). Under the conditions of the treatment substantially all of the α,α-dimethylbenzyl alcohol is converted to α,α-dimethylbenzyl hydroperoxide while other impurities are rendered relatively inert or are converted to materials more readily removable from the treated cumene. The presence of the carboxylic acid solvent, such as, acetic acid, aids materially in maintaining the desired treating conditions while contributing to the suppression of the formation of undesirable side reactions.

The duration of the treatment will vary considerably within the scope of the invention and will depend to some degree upon the conditions employed and the specific acid catalyst used. In general, contact times ranging, for example, from about ten minutes to about 24 hours, and preferably from about ½ to about 2 hours are satisfactory. Shorter or longer times of contact may, however, be employed within the scope of the invention.

The mixture comprising the treated cumene resulting from the treatment in accordance with the invention may be subjected to suitable recovery operations enabling the separation of cumene hydroperoxide therefrom. Such recovery operation may comprise, for example, one or more such steps as treatment with alkaline materials, extractive distillation, solvent extraction, distillation under reduce pressure, filtration, decantation, and the like. Thus, in the treatment of an α,α-dialkylphenylalkyl hydroperoxide, such as α,α-dimethylbenzyl hydroperoxide obtained by the oxidation of isopropylbenzene, with a strong mineral acid, such as, for example, sulphuric acid, the mixture resulting from the treatment may be subjected to a treatment comprising such steps as, for example, neutralization with sodium acetate followed by the stripping off of materials comprising volatile acids used as solvent or formed during the neutralization. The α,α-dimethylbenzyl hydroperoxide-containing residue from the stripping operation may be washed with a suitable solvent to effect the removal of material such as, for example, sodium sulfate and excess sodium acetate therefrom. An example of an alternative method for treating the mixture resulting from the sulfuric acid catalyzed hydrogen peroxide treatment of α,α-dimethylbenzyl hydroperoxide comprises, for example, the addition of water thereto, stratification of the resulting mixture in a settler to form an oil layer comprising cumene hydroperoxide and an aqueous layer. The oil layer is dried and the cumene hydroperoxide recovered therefrom by conventional means. The aqueous layer formed in the settler may be processed to recover acetic acid therefrom.

Although the foregoing description has stressed the addition of the hydrogen-peroxide treating agent to the crude aralkyl hydroperoxide under conditions precluding conversion of aralkyl hydroperoxide to any substantial degree it is to be pointed out that the invention is not necessarily limited thereto. The hydrogen peroxide treating agent may be added to the aralkyl hydroperoxide immediately prior to its subjection to conditions under which it undergoes conversion and may even be added during actual conditions of conversion of the aralkyl hydroperoxide. Thus in the acid-catalyzed decomposition of aralkyl hydroperoxide such as, for example, α,α-dimethylbenzyl hydroperoxide to phenol and acetone the hydrogen peroxide may be added to the aralkyl hydroperoxide just prior to and/or during its subjection to conditions of aralkyl hydroperoxide decomposition. Aralkyl hydroperoxide to be employed as a catalyst in a reaction such as, for example, a hydrocarbon polymerization, may have the hydrogen peroxide and acidic agent added thereto immediately prior to its use. In the reaction of an aralkyl hydroperoxide with a phenolic compound the hydrogen peroxide may be added to the aralkyl hydroperoxide prior to and/or during the reaction of the aralkyl hydroperoxide with the phenolic compound.

Although not indicative of the total desirable effect of the treatment, progress of the treatment in a manner determinative of the attainment of substantial purification is made possible by ascertainment of increase in aralkyl hydroperoxide content.

*Example*

Crude α,α-dimethylbenzyl hydroperoxide obtained by the direct oxidation of isopropyl benzene contained 73% by weight of α,α-dimethylbenzyl hydroperoxide. The rest of the crude α,α-dimethylbenzyl hydroperoxide consisted essentially of oxygen-containing impurities and a minor amount of cumene. 55% by weight of the material other than α,α-dimethylbenzyl hydroperoxide in the crude α,α-dimethylbenzyl hydroperoxide consisted of α,α-dimethylbenzyl alcohol. The crude α,α-dimethylbenzyl hydroperoxide was added to an admixture of 5 cc. acetic acid containing 2 drops concentrated $H_2SO_4$ and 1.25 cc. of 34% aqueous $H_2O_2$ at a temperature in the range of 5 to 10° C. The mixture was allowed to stand for 1½ hours at 5 to 10° C. Thereafter 0.5 gram sodium acetate was added thereto and the resulting mixture poured into a mixture of ether and water. The ether layer was washed with water. Ether was removed from the ether layer by distillation under reduced pressure leaving α,α-dimethylbenzyl hydroperoxide as residue. The residue was taken up in low boiling ether, dried with sodium sulfate, and the petroleum ether removed therefrom by distillation under reduced pressure. The residue remaining after the distillation was found to contain 77.5% by weight of α,α-dimethylbenzyl hydroperoxide.

The invention claimed is:

1. The method of treating impure aralkyl hydroperoxide containing oxygen-containing organic impurities in order to increase the purity thereof which comprises contacting said aralkyl hydroperoxide with hydrogen peroxide in the presence of an acid having a dissociation constant of at least $10^{-3}$ at a temperature in the range of from about −60 to about 35° C., maintaining said hydroperoxide at a temperature below about 35° C. at all times while in contact with said acid, and correlating the time of contact of said acid with said hydroperoxide and the temperature at which the resulting mixture is maintained to effect said treatment in the absence of any substantial cumene hydroperoxide decomposition.

2. The method of treating impure α,α-dialkyl aralkyl hydroperoxide containing oxygen-containing organic impurities obtained by the direct oxidation of the corresponding aromatic hydrocarbon to improve the purity thereof which comprises contacting said α,α-dialkyl aralkyl hydroperoxide with hydrogen peroxide in the presence of a strong mineral acid at a temperature in the range of from about −60 to about 35° C., maintaining said hydroperoxide at a temperature below about 35° C. at all times while in contact with said acid, and correlating the time of contact of said acid with said hydroperoxide and the temperature at which the resulting mixture is maintained to effect said treatment in the absence of any substantial cumene hydroperoxide decomposition.

3. The method in accordance with claim 2 wherein said treatment is effected in the absence of any substantial conversion of α,α-dialkyl hydroperoxide.

4. The process in accordance with claim 2 wherein said treatment is carried out in the presence of a carboxylic acid solvent.

5. The method of treating impure α,α-dialkyl phenylalkyl hydroperoxide obtained by the direct oxidation of the corresponding α,α-dialkyl substituted alkyl benzene to improve the purity thereof which comprises contacting said α,α-dialkyl phenylalkyl hydroperoxide with hydrogen with hydrogen peroxide in the presence of a strong mineral acid at a temperature in the range of from about −60 to about 35° C., maintaining said hydroperoxide at a temperature below about 35° C. at all times while in contact with said acid, and correlating the time of contact of said acid with said hydroperoxide and the temperature at which the resulting mixture is maintained to effect said treatment in the absence of any substantial cumene hydroperoxide decomposition.

6. The method in accordance with claim 5 wherein said strong mineral acid is concentrated sulfuric acid.

7. The method in accordance with claim 5 wherein said strong mineral acid is concentrated sulfuric acid and said treatment is effected at a temperature of from about −10° C. to about 15° C.

8. The method in accordance with claim 5 wherein said treatment is carried out in a carboxylic acid solvent.

9. The method of treating impure α,α-dialkylbenzylhydroperoxide obtained by the direct oxidation of the corresponding α,α-dialkylmethylbenzene which comprises contacting said α,α-dialkylbenzyl hydroperoxide with hydrogen peroxide in the presence of a strong mineral acid at a temperature in the range of from about −60 to about 35° C., maintaining said hydroperoxide at a temperature below about 35° C. at all times while in contact with said acid, and correlating the time of contact of said acid with said hydroperoxide and the temperature at which the resulting mixture is maintained to effect said treatment in the absence of any substantial cumene hydroperoxide decomposition.

10. The method in accordance with claim 9 wherein said strong mineral acid is concentrated sulfuric acid.

11. The method in accordance with claim 9 wherein said treatment is effected at a temperature of from about −10° C. to about 15° C.

12. The method in accordance with claim 9 wherein said treatment is effected in the presence of a carboxylic acid.

13. The method of treating pure α,α-dimethylbenzyl hydroperoxide obtained by the direct oxidation with molecular oxygen of isopropyl benzene to improve the purity thereof, which comprises contacting said α,α-dimethylbenzyl hydroperoxide with hydrogen peroxide in the presence of an acid having a dissociation constant of at least $10^{-3}$ at a temperature in the range of from about −60 to about 35° C., maintaining said hydroperoxide at a temperature below about 35° C. at all times while in contact with said acid, and correlating the time of contact of said acid with said hydroperoxide and the temperature at which the resulting mixture is maintained to effect said treatment in the absence of any substantial cumene hydroperoxide decomposition.

14. The method of treating impure α,α-dimethylbenzyl hydroperoxide obtained by the direct oxidation of isopropylbenzene which comprises contacting said α,α-dimethylbenzyl hydroperoxide with hydrogen peroxide in the presence of a strong mineral acid at a temperature in the range of from about −60 to about 35° C., maintaining said hydroperoxide at a temperature below about 35° C. at all times while in contact with said acid, and correlating the time of contact of said acid wth said hydroperoxide and the temperature at which the resulting mixture is maintained to effect said treatment in the absence of any substantial cumene hydroperoxide decomposition.

15. The method in accordance with claim 14 wherein said strong mineral acid is concentrated sulfuric acid.

16. The method in accordance with claim 14 wherein said treatment is effected in the absence of any substantial conversion of a α,α-dimethylbenzyl hydroperoxide.

17. The method in accordance with claim 14 wherein said treatment is effected in the presence of a solvent consisting essentially of acetic acid.

18. The method of treating impure α,α-dimethylbenzyl hydroperoxide obtained by the direct oxidation of isopropylbenzene to improve the purity thereof, which comprises contacting said α,α-dimethylbenzyl hydroperoxide with hydrogen peroxide in the presence of sulfuric acid at a temperature of from about −10° C. to about 15° C. and correlating the time of contact of said acid with said hydroperoxide and the temperature at which the resulting mixture is maintained to effect said purification in the absence of any substantial decomposition of said hydroperoxide.

19. The method in accordance with claim 18 wherein said treatment is effected in the presence of a solvent consisting essentially of acetic acid.

References Cited in the file of this patent

UNITED STATES PATENTS

| 2,176,407 | Milas | Oct. 17, 1939 |
| 2,438,125 | Lorand et al. | Mar. 23, 1948 |
| 2,618,662 | Hutchinson | Nov. 18, 1952 |

OTHER REFERENCES

Khorasch et al.: Jour. Organic Chem., vol. 15, pgs. 773–781 (9 pages, July 1950).